Figure 1:
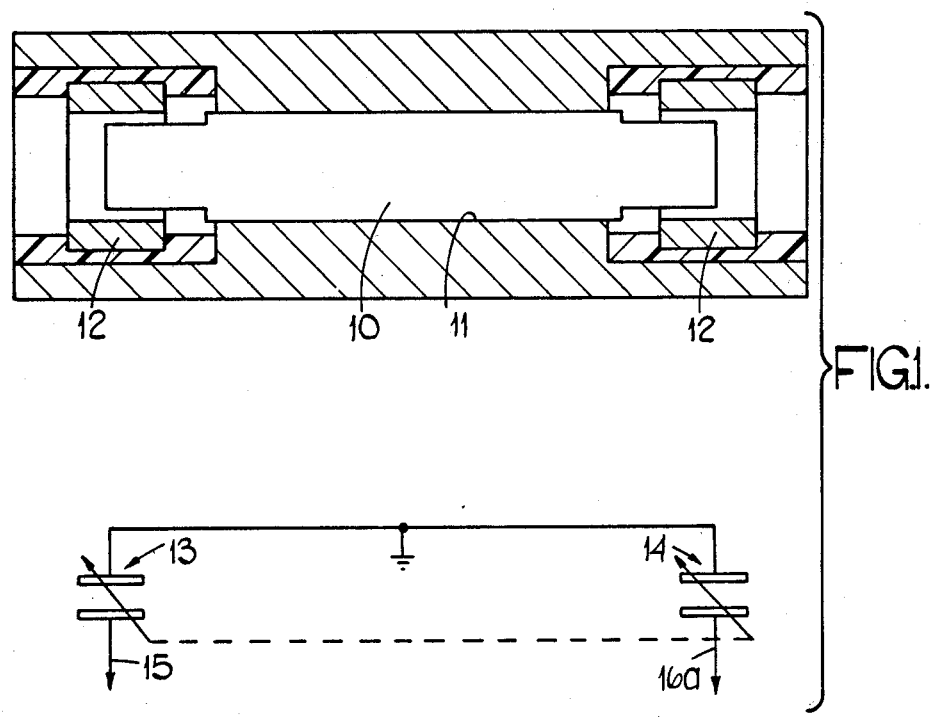

United States Patent [19]

Morris

[11] 4,263,546
[45] Apr. 21, 1981

[54] DISPLACEMENT TRANSDUCER SYSTEM
[75] Inventor: Adrian P. Morris, London, England
[73] Assignee: Lucas Industries Limited, Birmingham, England
[21] Appl. No.: 54,880
[22] Filed: Jul. 5, 1979
[30] Foreign Application Priority Data
Jul. 12, 1978 [GB] United Kingdom ............ 29554/78
[51] Int. Cl.³ .......................................... G01R 27/26
[52] U.S. Cl. .................................... 324/61 R; 318/662
[58] Field of Search ............ 324/61 R; 318/632, 634, 318/652, 662

[56] References Cited
U.S. PATENT DOCUMENTS

| 2,880,384 | 3/1959 | Surtees ................................ 318/662 |
| 3,263,167 | 7/1966 | Foster et al. ...................... 324/61 R |
| 3,323,699 | 6/1967 | Bricker, Jr. ..................... 324/61 R X |
| 3,753,373 | 8/1973 | Brown ........................... 324/61 R X |

Primary Examiner—Stanley T. Krawczewicz

[57] ABSTRACT

A displacement transducer system for providing a signal indicative of the position of a member, comprising a pair of voltage controlled oscillators the frequency of which is determined by a pair of variable reactance components, the reactance of one increasing while that of the other decreases as the member is moved in one direction and vice versa. The oscillators form part of a pair of phase locked loops to which an AC signal is supplied which depends upon the sum of the reactances of the comparator. The difference of the reactances is derived from the outputs of the oscillators and is used to control a counter which also is supplied with the AC signal. The count value of the counter indicating the difference of the reactances of the components.

7 Claims, 6 Drawing Figures

DISPLACEMENT TRANSDUCER SYSTEM

This invention relates to a displacement transducer system for measuring the displacement of a member.

Many forms of transducer system are known in which the displacement of a member is converted into an electrical signal which can be presented in a visual manner to enable the displacement and/or position of the member to be indicated directly. One problem with transducer systems is drift due to changes in the environment in which the transducer is operating. For example, an increase in temperature may result in a reduced clearance which can affect an inductance value or a capacitance value. The transducer must therefore be recalibrated or if recalibration during use is to be avoided, temperature compensation means must be provided which may require that the transducer be checked over a wide range of temperatures before use, in order that the correct amount of compensation is applied.

The object of the invention is to provide a displacement transducer system which is substantially self-compensating for changes in the working environment.

According to the invention a transducer system comprises first means producing a variable output which varies in accordance with the position of said member, second means for providing a reference signal which is determined at least in part by the first means but which is substantially constant irrespective of the position of the member and third means for comparing said output and said reference signal to provide an indication of the position of said member.

According to a further feature of the invention a transducer system comprises a voltage controlled frequency generator, a pair of phase locked loops each including a phase comparator and a voltage controlled oscillator which receives a control voltage from the respective comparator and two comparators being supplied with a reference frequency obtained from said frequency generator in addition to the output of the respective voltage controlled oscillator, each voltage controlled oscillator having a reactive timing component associated therewith, the values of the two timing components being determined by the position of the member such that as the member moves in one direction the reactance of one component will increase whilst that of the other component will decrease and vice versa means for providing a voltage dependant upon the sum of the reactances of said components and for applying said voltage to the voltage controlled frequency generator, means for comparing the phases of the outputs of said voltage controlled oscillators, the output of said means being applied to a counter which receives a further input from said frequency generator, the count value provided by the counter being an indication of the phase difference between the outputs of said voltage controlled oscillators, the phase difference itself being an indication of the difference in the reactive values of the two timing components and hence the position of said member.

Figure 2:
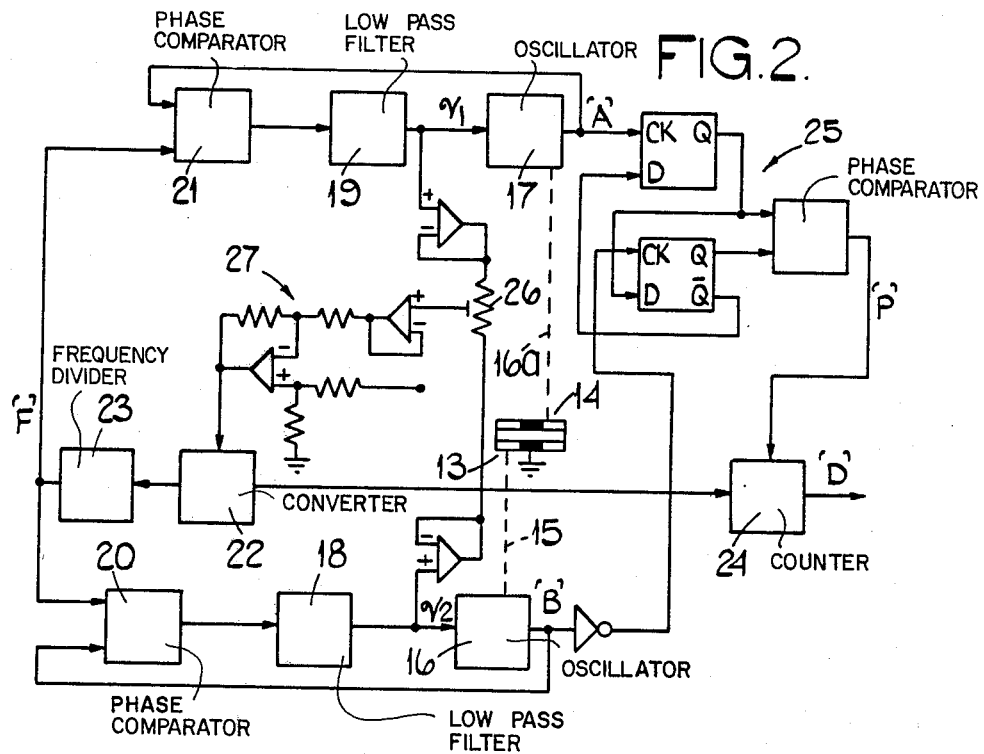
Figure 3:
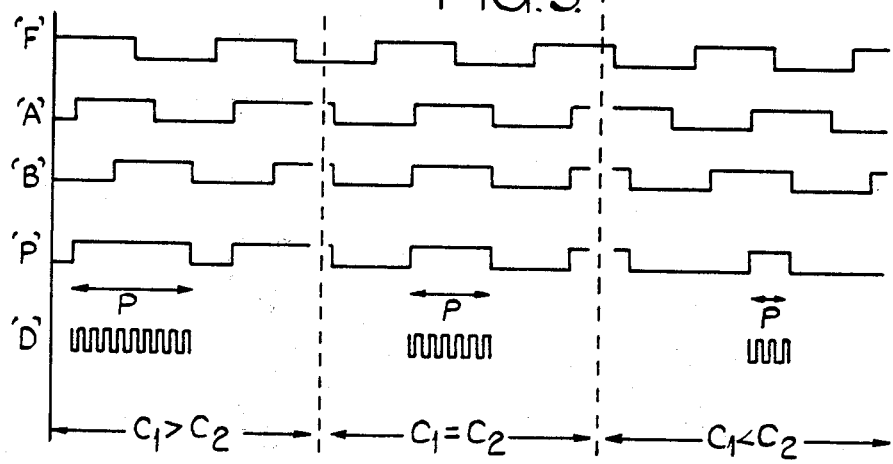
Figure 4:
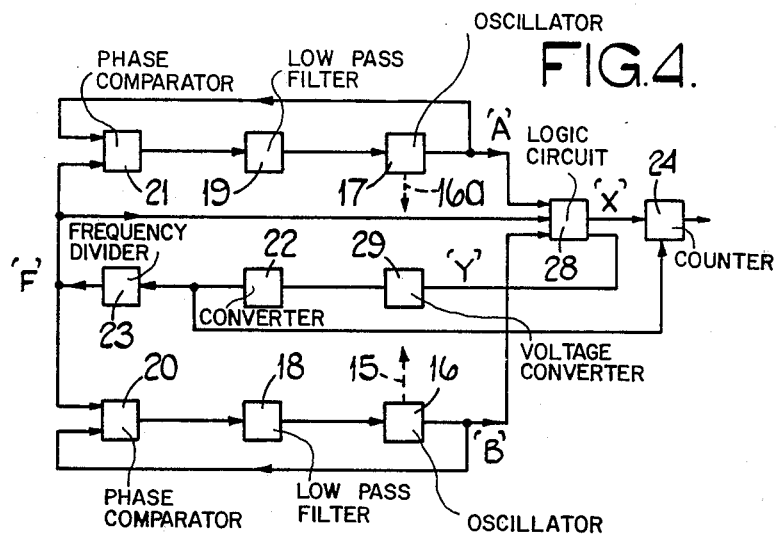
Figure 5:
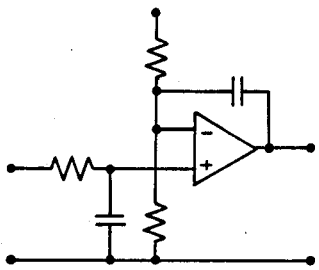
Figure 6:
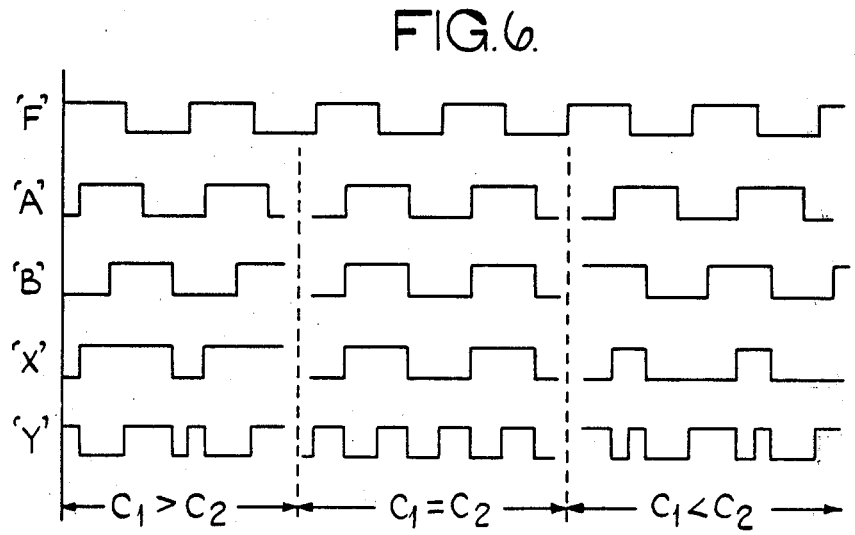

One example of a transducer system in accordance with the invention will now be described with reference to the accompanying drawings in which:

FIG. 1 shows in its upper portion the mechanical arrangement of a member the position of which it is required to sense, whilst the lower portion shows the equivalent electrical circuit, FIG. 2 shows an electrical diagram of one example of the system, FIG. 3 shows pulse diagrams relating to the operation of the system of FIG. 2, FIGS. 4 and 5 show electrical diagrams of another example, and, FIG. 6 is similar to FIG. 3 but related to the system of FIGS. 4 and 5.

Referring to the drawings, the member the position of which it is required to sense is indicated at 10 and in the particular example it comprises a free piston which is located within a bore 11. The piston and bore form part of the fuel supply system of an injection pump intended to supply fuel to an internal combustion engine. In use, fuel is supplied to one end of the bore 11 to cause displacement of the piston towards the other end of the bore and fuel contained in that end of the bore is displaced to the injection pump. The movement of the piston is therefore an indication of the amount of fuel which is supplied to the injection pump.

As will be seen from the upper portion of FIG. 1, the ends of the piston are of reduced diameter and are located in enlarged portions of the bore 11. Located in the enlarged portions of the bore are a pair of rings 12 each of which constitutes one plate of a capacitor the other plate of which is constituted by the adjacent reduced end portion of the piston. The rings are electrically isolated from the wall of the enlarged portions of the bore. The lower portion of FIG. 1 indicates the electrical circuit diagram and it will be seen to comprise two variable capacitors 13, 14 one plate of each capacitor being connected to earth and the other plates of the capacitors being connected to external leads 15, 16a and it will be appreciated that as the capacitance value of one capacitor increases the capacitance value of the other capacitor decreases. Moreover, the sum of the two capacitance values remains constant unless there is a change in the working environment, for example, a change in the permativity of the fuel or a change due to a temperature variation, in the clearance between the rings 12, and the reduced end portions of the piston.

Turning now to FIG. 2, the two capacitors 13 and 14 are shown to be connected respectively to a pair of voltage controlled oscillators 16, 17. The inputs of the oscillators comprise the voltages V1, V2 obtained at the outputs of a pair of low pass filters 18, 19 which in turn have their inputs connected to the outputs respectively of a pair of phase comparators 20, 21. Each phase comparator receives the output of the associated oscillator and the two phase comparators, the two filters and the two voltage controlled oscillators form a pair of phase locked loops referenced A and B.

Also provided is a voltage controlled frequency generator which is in the form of a voltage to frequency converter 22. The output of this converter is applied to a frequency divider 23 and the output of the frequency divider is connected to the other inputs of the phase comparators 20, 21. The output of the frequency divider 23, is a frequency which hereinafter is referred to as the reference frequency.

The output of the voltage to frequency converter 22 is applied to a counter 24. The frequency of this signal is equal to the aforesaid reference frequency multiplied by the division ratio of the frequency divider 23. In addition there is applied to the counter 24 a signal representative of the phase difference between the frequencies generated by the two voltage controlled oscillators 16, 17 this being obtained from a phase comparator generally indicated at 25.

The voltages V1 and V2 at the outputs of the low pass filters are added together utilising a tapped resistor 26 to the opposite ends of which the voltages at the outputs of the low pass filter are applied through non-inverting amplifiers. The voltage obtained at the tapping of the resistor 26 is applied through an amplifier network 27 to the voltage to frequency converter 22.

Considering now the operation of the circuit, each capacitor can be regarded as forming the timing component of the respective phase locked loop and both these loops are locked to the reference frequency. The control voltage i.e. the voltage appearing at the output of the low pass filter of each phase lock loop is proportional to the value of the capacitance which controls the voltage controlled oscillator of that loop. The two voltages are added together and are utilised to control the reference frequency. The phase difference between the output of each voltage controlled oscillator and the reference frequency is proportional to the value of the capacitance controlling the voltage controlled oscillator. As a result the phase difference between the outputs of the voltage controlled oscillators is also dependent upon the difference between the capacitance values of the two capacitors. The phase comparator circuit 25 provides an output depending upon the difference in the phase and this signal which is shown at "P" in FIGS. 2 and 3 is applied to the counter 24. The counter 24 also receives a signal dependent upon the reference frequency but having a higher frequency by the division ratio of the frequency divider 23. Hence, the counter produces a count which is representative of the relative values of the two capacitors. Referring to FIG. 3, this is divided into three sections, the first being the case where the value of capacitor C1 is greater than that of C2, the second case being where the two values are equal and the third case being where the value of capacitor C2 is greater than C1. It will be noted that the phase comparator 25 is so arranged that the signal P does not disappear when the values of the two capacitors are equal since this would require additional means for indicating which side of the mid-position, the piston was disposed.

In the system described above in the event that there is some variation in the sum of the two capacitances due to an environmental change, the reference frequency also varies to provide compensation.

With reference now to FIGS. 4, 5 and 6; in FIG. 4 components identical to those of the system shown in FIG. 2 are assigned the same reference numerals. It will be noted in FIG. 4 that unlike the previous example the control voltages applied to the voltage controlled oscillators 16 and 17 are not utilised to generate the voltage applied to the voltage controlled frequency generator i.e. the frequency converter 22. Instead the control voltage for the converter 22 is obtained from a mark/space to voltage convertor 29 the circuit of which is shown in detail in FIG. 5.

The outputs of the voltage controlled oscillators 16, 17 together with the reference frequency are supplied to a logic circuit 28 which produces the signals X and Y these being supplied to the counter 24 and the mark/space to voltage converter 29 respectively. FIG. 6 indicates the relationship between the signals supplied to and obtained from the logic circuit.

I claim:

1. A displacement transducer system comprising a voltage controlled frequency generator, a pair of phase locked loops each including a phase comparator and a voltage controlled oscillator which receives a control voltage from the respective comparator the two comparators being supplied with a reference frequency obtained from said frequency generator in addition to the output of the respective voltage controlled oscillator, each voltage controlled oscillator having a reactive timing component associated therewith, the values of the two timing components being determined by the position of the member such that as the member moves in one direction the reactance of one component will increase whilst that of the other component will decrease and vice versa, means for providing a voltage dependant upon the sum of the reactances of said components and for applying said voltage to the voltage controlled frequency generator, means for comparing the phases of the outputs of said voltage controlled oscillators, the output of said means being applied to a counter which receives a further input from said frequency generator, the count value provided by the counter being an indication of the phase difference between the outputs of said voltage controlled oscillators, the phase difference itself being an indication of the difference in the reactive values of the two timing components and hence the position of said member.

2. A transducer system according to claim 1 including low pass filters in said phase locked loops respectively, said low pass filters being disposed between the phase comparators and the voltage controlled oscillators.

3. A transducer system according to claim 1 in which the means for providing a voltage dependant upon the sum of the reactances of said components comprises means for adding the voltages appearing at the outputs of the low pass filters.

4. A transducer system according to claim 3 in which said means comprises a tapped resistor to the opposite ends of which said voltages are supplied through amplifiers respectively, the tapping of said resistor being connected to the voltage controlled frequency generator.

5. A transducer system according to claim 4 in which the means for comparing the phases of the outputs of said voltage controlled oscillators comprises a phase comparator.

6. A transducer system according to claim 1 or claim 2 in which the means for providing a voltage dependant upon the sum of the reactances of said components comprises a logic circuit and a mark/space to voltage converter, the outputs of said voltage controlled oscillators being supplied to said logic circuit.

7. A transducer system according to claim 6 in which said logic unit constitutes the means for comparing the phases of the outputs of said voltage controlled scillators.

* * * * *